United States Patent
Zhou et al.

(10) Patent No.: US 12,547,318 B2
(45) Date of Patent: Feb. 10, 2026

(54) VOLTAGE WINDOW ADJUSTMENT

(71) Applicant: Micron Technology, Inc., Boise, ID (US)

(72) Inventors: Zhenming Zhou, San Jose, CA (US); Nagendra Prasad Ganesh Rao, Folsom, CA (US); Joshua C. Garrison, Folsom, CA (US); Jian Huang, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 656 days.

(21) Appl. No.: 17/887,244

(22) Filed: Aug. 12, 2022

(65) Prior Publication Data

US 2023/0393752 A1 Dec. 7, 2023

Related U.S. Application Data

(60) Provisional application No. 63/348,479, filed on Jun. 2, 2022.

(51) Int. Cl.
| | | |
|---|---|---|
| G11C 16/34 | (2006.01) | |
| G06F 3/06 | (2006.01) | |
| G11C 16/04 | (2006.01) | |

(52) U.S. Cl.
CPC .......... G06F 3/0616 (2013.01); G06F 3/0653 (2013.01); G06F 3/0679 (2013.01); G11C 16/34 (2013.01); G11C 16/0483 (2013.01)

(58) Field of Classification Search
CPC .... G06F 3/0616; G06F 3/0653; G06F 3/0679; G11C 16/34; G11C 16/0483; G11C 29/023; G11C 2207/2254; G11C 16/3418; G11C 16/3404; G11C 16/349; G11C 29/028; G11C 29/50012; G11C 16/32; G11C 16/26

See application file for complete search history.

(56) References Cited

U.S. PATENT DOCUMENTS

| | | |
|---|---|---|
| 5,995,417 A | 11/1999 | Chen et al. |
| 9,330,784 B2 | 5/2016 | Pangal et al. |
| 9,355,713 B2 | 5/2016 | Huang et al. |
| 2014/0047302 A1* | 2/2014 | Guo ............ G11C 16/26 714/773 |
| 2016/0188404 A1 | 6/2016 | Das |
| 2017/0125111 A1* | 5/2017 | Sankaranarayanan ........ G06F 11/0793 |
| 2017/0213597 A1* | 7/2017 | Micheloni ............ G11C 16/12 |
| 2020/0105363 A1* | 4/2020 | Natarajan ............ G11C 29/883 |
| 2020/0201726 A1* | 6/2020 | Lee .................... G06F 11/1012 |

* cited by examiner

Primary Examiner — Uyen Smet
(74) Attorney, Agent, or Firm — Brooks, Cameron & Huebsch, PLLC

(57) ABSTRACT

An example system can include a memory component and a processing device. The memory component can include a group of memory cells. The processing device can be coupled to the memory component. The processing device can be configured to use a first voltage window for a set of memory cells of the group of memory cells during a first time period. The processing device can be configured to determine that an error rate of a sub-set of the set of memory cells is above a threshold error rate. The processing device can be configured to, in response to the determination that the error rate of the sub-set of memory cells is above the threshold error rate, use a second voltage window for the set of memory cells of the group of memory cells during a second time period.

19 Claims, 8 Drawing Sheets

VOLTAGE WINDOW ADJUSTMENT

PRIORITY INFORMATION

This application claims priority to U.S. Provisional Application Ser. No. 63/348,479, filed on Jun. 2, 2022, the contents of which are incorporated herein by reference.

TECHNICAL FIELD

Embodiments of the disclosure relate generally to memory sub-systems, and more specifically, relate to voltage window adjustment.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
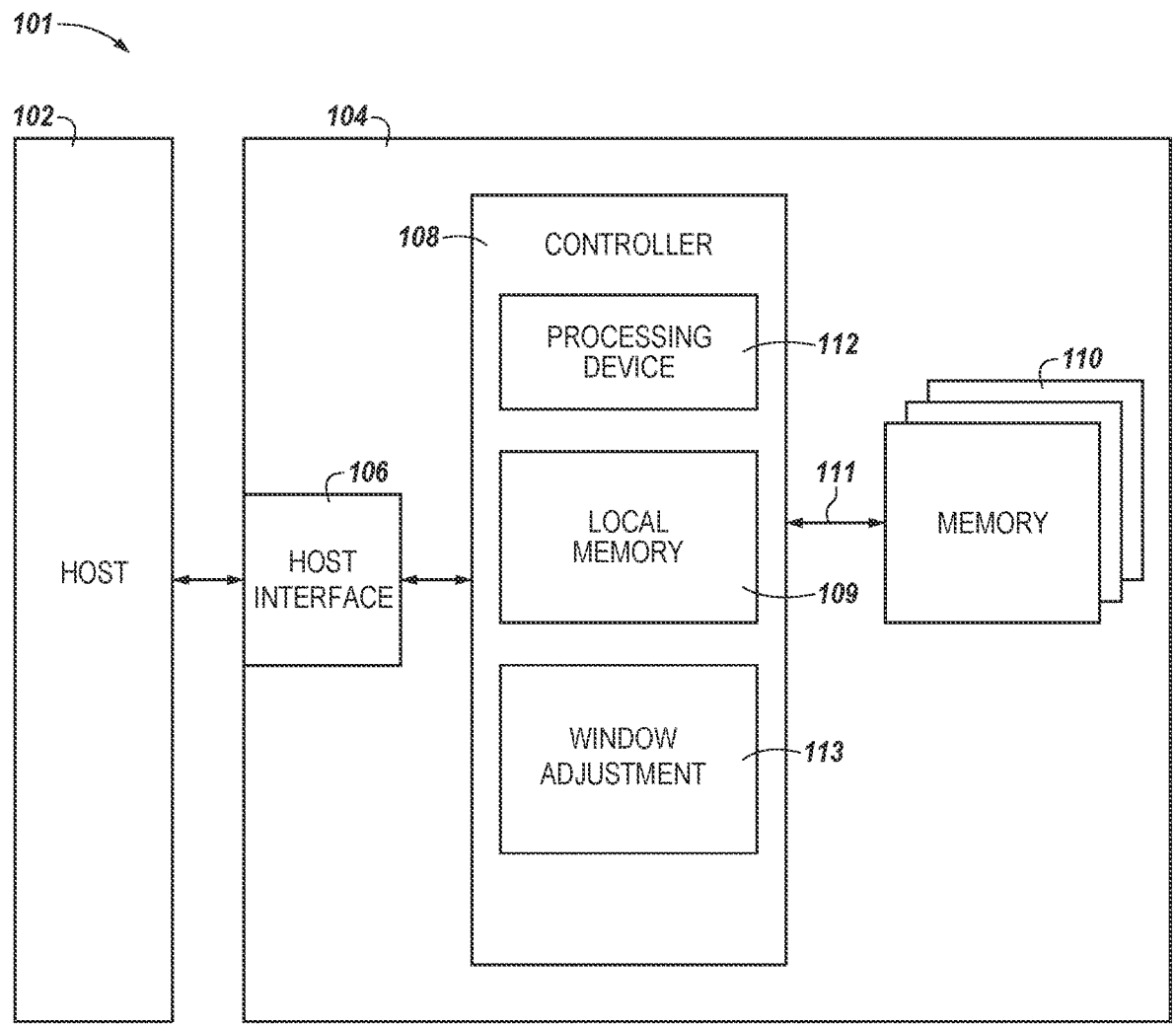
FIG. 1 illustrates an example computing environment that includes a memory sub-system in accordance with some embodiments of the present disclosure.

Aspects of the present disclosure are directed to voltage window adjustment within a memory sub-system. A memory sub-system is also hereinafter referred to as a "memory device." An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

In various memory sub-systems, programming cells can involve providing a programming signal to a group of cells (e.g., a page) to place them in target states, which correspond to respective stored data patterns. For example, the cells can be non-volatile flash memory cells configured to store one or more bits of data per cell. As an example, a programming signal used to program the cells can comprise a stepped voltage signal (e.g., voltage ramp) with each step having an associated step size and duration. The programming signal can be applied (e.g., to a word line) as a series of voltage pulses, for instance. The voltage pulses have various characteristics which can affect a voltage window associated with the programmed cells. A voltage window (e.g., a read window budget) can refer to the cumulative value (e.g., in voltage) of a number (e.g., seven in the case of a triple level memory cell) of distances (e.g., in voltage) between adjacent threshold voltage distributions at a particular bit error rate (BER). Such characteristics include pulse magnitude, step size between pulses (e.g., program step size), and pulse duration (e.g., program step duration), among various other characteristics. As used herein, a program step size can be referred to as a voltage difference between successive voltage pulses, and a program step duration can be referred to as a duration for which a voltage pulse is applied. In relation to program step duration, in at least one example, program step duration can be measured by counting clock cycles of a known frequency between a time a program command was issued to a memory (e.g., NAND) and when the memory programming operation is complete. In another example, the program step duration can be measured by using a number of program pulses used to complete the memory program operation and apply a known amount of time for each pulse.

As described further herein, a voltage window, which may be referred to as a read window width, refers to a distance (e.g., in voltage) between adjacent threshold voltage (Vt) distributions. A voltage window may also be referred to as a "valley margin" since the Vt distributions include respective peaks with the regions therebetween being referred to as valleys. The voltage window corresponding to a group of memory cells can be affected by various factors such as temperature, wear cycling (e.g., program/erase cycles), etc. Therefore, the voltage window of a system can vary over time, which can affect system quality of service (QoS), reliability, and/or performance. In various instances, it can be beneficial to maintain a specified voltage window in order to maintain a particular system characteristic (e.g., QoS, error rate, etc.) across various environmental conditions and/or user workloads. However, it can also be beneficial to provide the ability to dynamically adjust a voltage window in order to change one or more system characteristics. For instance, in some previous approaches, an increasing bit error rate at a particular voltage window can result in the corresponding memory cells being retired when the bit error rate exceeds a threshold bit error rate, thereby reducing the size of usable memory and further limiting system performance and capability.

In contrast, embodiments of the present disclosure address the above and other deficiencies by providing a memory sub-system capable of adjusting a voltage window in response to a bit error rate of a set of memory cells exceeding a threshold bit error rate. The adjusted voltage window can be tested, using a check operation, to determine whether the adjusted voltage window value achieves a bit error rate that is now below the threshold bit error rate.

FIG. 1 illustrates an example computing environment 101 that includes a memory sub-system 104 in accordance with some embodiments of the present disclosure. The memory sub-system 104 can include media, such as memory components 110. The memory components 110 can be volatile memory components, non-volatile memory components, or a combination of such. In some embodiments, the memory sub-system is a storage system. An example of a storage system is a SSD. In some embodiments, the memory sub-system 104 is a hybrid memory/storage sub-system. In general, the computing environment 100 can include a host system 102 that uses the memory sub-system 104. For example, the host system 102 can write data to the memory sub-system 104 and read data from the memory sub-system 104.

The host system 102 can be a computing device such as a personal laptop computer, a desktop computer, a digital camera, a mobile telephone, or a memory card reader, among various other types of hosts. The host system 102 can include or be coupled to the memory sub-system 104 (e.g., via a host interface 106) so that the host system 120 can read data from or write data to the memory subsystem 104. As used herein, "coupled to" generally refers to a connection between components, which can be an indirect communicative connection or direct communicative connection (e.g., without intervening components), whether wired or wireless, including connections such as electrical, optical, magnetic, etc. The host interface 106 can be a physical interface, examples of which include, but are not limited to, a serial advanced technology attachment (SATA) interface, a peripheral component interconnect express (PCIe) interface, universal serial bus (USB) interface, Fibre Channel, Serial Attached SCSI (SAS), etc. The host interface 106 can be used to transmit data between the host system 120 and the memory sub-system 104. The host system 102 can further utilize an NVM Express (NVMe) interface to access the memory components 110 when the memory sub-system 104 is coupled with the host system 102 by a PCIe interface. The physical host interface can provide an interface for passing control, address, data, and other signals between the memory sub-system 104 and the host system 102. The memory components 110 can include a number of arrays of memory cells (e.g., non-volatile memory cells). The arrays can be flash arrays with a NAND architecture, for example. However, embodiments are not limited to a particular type of memory array or array architecture. Although floating-gate type flash memory cells in a NAND architecture are generally referred to herein, embodiments are not so limited. The memory cells can be grouped, for instance, into a number of blocks including a number of physical pages. A number of blocks can be included in a plane of memory cells and an array can include a number of planes. As one example, a memory device can be configured to store 8 KB (kilobytes) of user data per page, 128 pages of user data per block, 2048 blocks per plane, and 16 planes per device. The memory components 110 can also include additionally circuitry (not illustrated), such as control circuitry, buffers, address circuitry, etc.

In operation, data can be written to and/or read from memory (e.g., memory components 110 of system 104) as a page of data, for example. As such, a page of data can be referred to as a data transfer size of the memory system. Data can be sent to/from a host (e.g., host 102) in data segments referred to as sectors (e.g., host sectors). As such, a sector of data can be referred to as a data transfer size of the host.

The memory components 110 can include various combinations of the different types of non-volatile memory components and/or volatile memory components. An example of non-volatile memory components includes a negative-and (NAND) type flash memory. The memory components 110 can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 102. Although non-volatile memory components such as NAND type flash memory are described, the memory components 110 can be based on various other types of memory such as a volatile memory. In some embodiments, the memory components 110 can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 110 can be grouped as memory pages or data blocks that can refer to a unit of the memory component used to store data.

As illustrated in FIG. 1, the memory sub-system 104 can include a controller 108 coupled to the host interface 106 and to the memory components 110 via a memory interface 111. The controller 108 can be used to send data between the memory sub-system 104 and the host 102. The memory interface 111 can be one of various interface types compliant with a particular standard such as Open NAND Flash interface (ONFi).

The controller 108 can communicate with the memory components 110 to perform operations such as reading data, writing data, or erasing data at the memory components 110 and other such operations. The controller 108 can include hardware such as one or more integrated circuits and/or discrete components, a buffer memory, or a combination thereof. The controller 108 can be a microcontroller, special purpose logic circuitry (e.g., a field-programmable gate array (FPGA), an application-specific integrated circuit (ASIC), etc.), or other suitable processor. The controller 108 can include a processing device 112 (e.g., processor) configured to execute instructions stored in local memory 109. In the illustrated example, the local memory 109 of the controller 108 includes an embedded memory configured to store instructions for performing various processes, operations, logic flows, and routines that control operation of the memory sub-system 104, including handling communications between the memory sub-system 104 and the host system 102. In some embodiments, the local memory 109 can include memory registers storing memory pointers, fetched data, etc. The local memory 109 can also include read-only memory (ROM) for storing micro-code.

While the example memory sub-system 104 in FIG. 1 has been illustrated as including the controller 108, in another embodiment of the present disclosure, a memory sub-system 104 may not include a controller 108, and can instead rely upon external control (e.g., provided by an external host, such as by a processing device separate from the memory sub-system 104).

The controller 108 can use and/or store various operating parameters associated with operating (e.g., programming and/or reading) the memory cells. Such operating parameters may be referred to as trim values and can include programming pulse magnitude, step size, pulse duration, program verify voltages, read voltages, etc. for various different operating processes. The different processes can include processes to program cells to store different quantities of bits, and different multiple pass programming process types (e.g., 2-pass, 3-pass, etc.). The controller 108 can be responsible for other operations such as wear leveling operations, garbage collection operations, error detection and/or correction (e.g., error-correcting code (ECC)) operations, encryption operations, caching operations, and address translations between a logical block address and a physical block address that are associated with the memory components 110.

The memory sub-system 104 can also include additional circuitry or components that are not illustrated. For instance, the memory components 110 can include control circuitry, address circuitry (e.g., row and column decode circuitry), and/or input/output (I/O) circuitry by which they can communicate with controller 108 and/or host 102. As an example, in some embodiments, the address circuitry can receive an address from the controller 108 and decode the address to access the memory components 110.

In various embodiments, the controller 108 can include a window adjustment component 113 to adjust a voltage window associated with a set of memory cells. The memory cells can be programmed, for example, via an incremental step pulse programming (ISPP) process in which a series of pulses of increasing magnitude are applied to the cells (to their gates) to increase the stored charge by a particular amount until the target stored threshold voltage (Vt) is reached. To program the cells, a program step characteristic can be used and can include, for example, various characteristics of voltage pulses used to program memory cells of the memory components 110. The characteristic can be, for example, a step size (e.g., voltage difference) between programming voltage pulses (e.g., between consecutive pulses). In another example, the characteristic can be a duration for which programming voltage pulse(s) are applied to memory cells.

Figure 2:
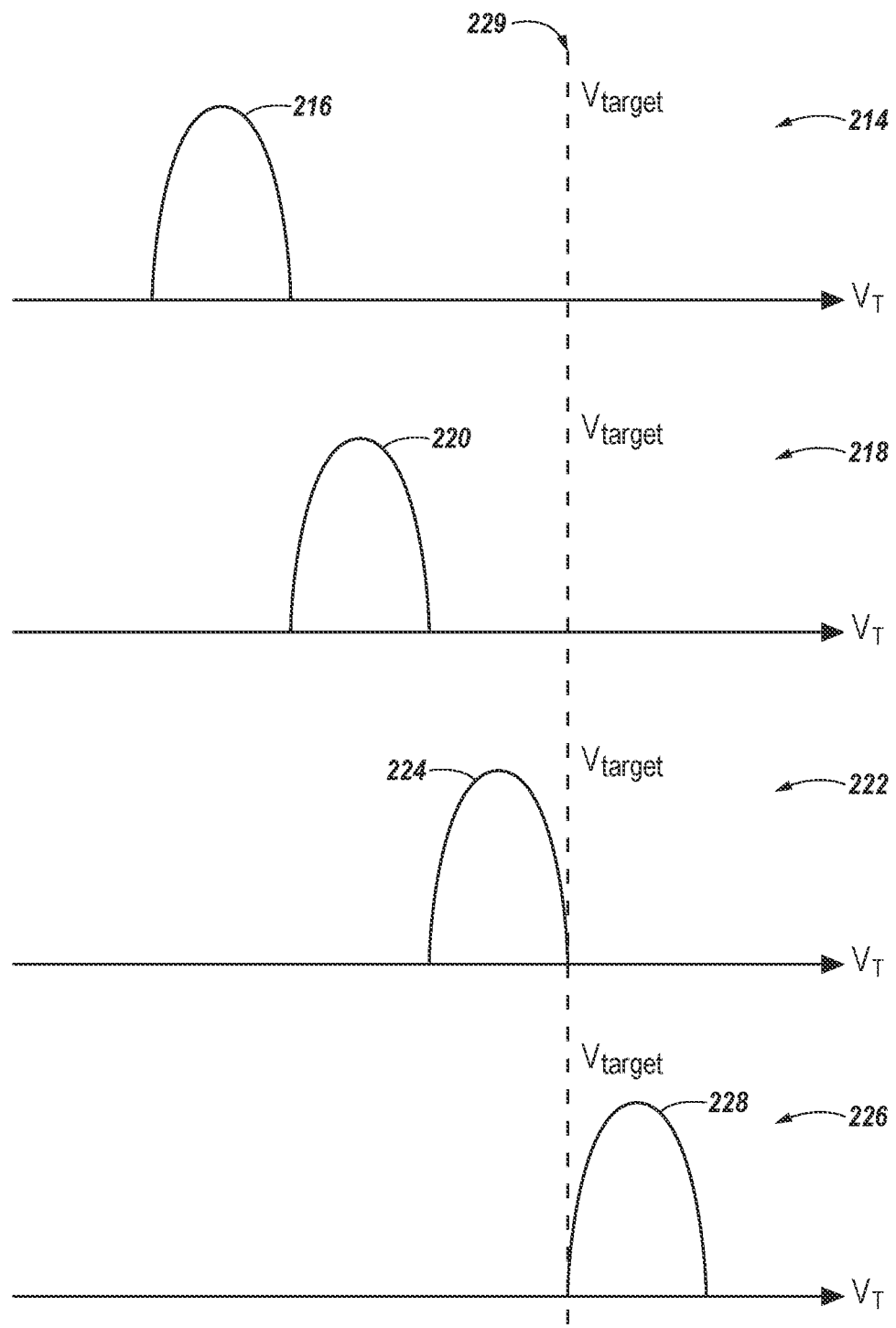
FIG. 2 illustrates an example of programming memory cells in accordance with some embodiments of the present disclosure.

Further, for instance, FIG. 2 illustrates threshold voltage (Vt) distributions of cells, which correspond to the charge stored on the charge storage structures of the memory cells, at various stages of one such incremental programming operation. Stage 214 can represent a time at which the programming operation begins. Accordingly, as shown by Vt distribution 216, the Vt of all the cells is below the target Vt level (Vtarget) 229. To program the memory cells to the desired target Vtarget 229, a series of programming steps (e.g., voltage pulses) can be used at each of a number of subsequent stages 218, 222 and 226 to increase the cell Vt levels as shown by distributions 220, 224 and 228, respectively. After each programming step, a program verify operation can be performed to verify whether the cells being programmed have reached Vtarget 229. As shown in FIG. 2, programming of the cells is completed at stage 226, as the Vt levels of all the cells have been increased to at or above the desired target Vt level 229.

The amount by which the Vt distributions 216, 220, 224 and 228 increase responsive to an applied programming pulse can depend on various factors such as the magnitude of the pulse and the duration for which the pulse is applied to the cells. Accordingly, the time to program a group of cells to desired states can vary depending upon the programming signal characteristics as well as the quantity of pulses. Additionally, multiple programming passes can be used to program multiple logical page data to cells. For example, a first pass, which can be referred to as a lower page programming process, can be used to program one or more lower pages of data to a group of cells, and one or more subsequent programming passes can be used to program additional pages of data to the group of cells.

The illustration of FIG. 2 demonstrates that different corresponding logical states can correspond to different varying voltage values. For instance, increasing a voltage value past a threshold voltage value, as shown in FIG. 2, can indicate that a particular bit value of "0" at the value below the threshold is now indicative of a bit value of "1" after the voltage value exceeds the threshold. In this way, different values can be stored at different voltage values and the corresponding voltage window that indicates such bit values can be adjusted, as will be described below.

Figure 3:
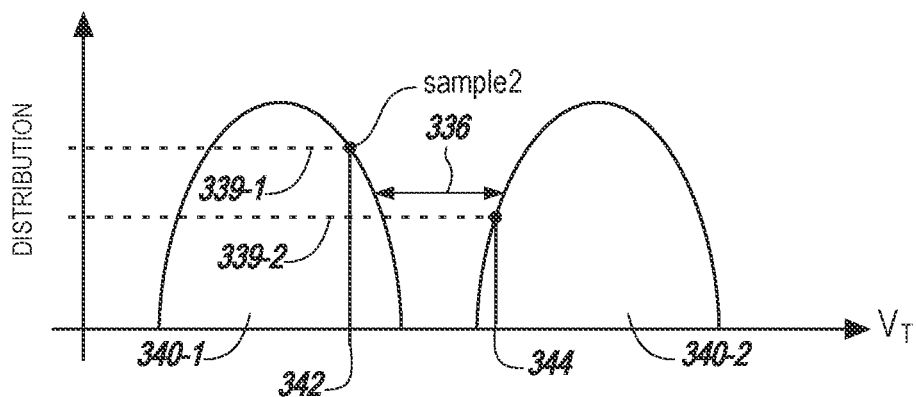
FIG. 3 illustrates a read window between threshold voltage distributions corresponding to memory cells programmed in accordance with some embodiments of the present disclosure.

FIG. 3 illustrates a voltage window 336 between threshold voltage (Vt) distributions 340-1 and 340-2 of memory cells programmed in accordance with some embodiments of the present disclosure. The example Vt distributions 340-1 and 340-2 (collectively referred to as Vt distributions 340) can be analogous to the Vt distributions shown in FIG. 2 (e.g., Vt distributions 224, 228) and can correspond to a particular bit value stored in the memory cells.

As illustrated in FIG. 3, the voltage window 336 can be a distance between the Vt distributions 340-1, 340-2. The voltage window 336 between Vt distributions can be used to program a memory cell with sufficient voltage separation in order to indicate a bit value of "0" or "1" without them overlapping and creating bit errors during a read operation of the memory cell. In a number of embodiments, and as described in FIG. 3, a first voltage 342 can correspond to the Vt distribution 340-1 with a corresponding first distribution value 339-1. Further, a second voltage 344 can correspond to the Vt distribution 340-2 with a corresponding second distribution value 339-2. In this way, the voltage window 336 provides enough separation to ensure that there is a distinction between each of the voltage distributions and corresponding bit values. However, as will be described in association with FIG. 4, the voltage distributions, over time, can begin to overlap and cause errors during a read operation.

Figure 4:
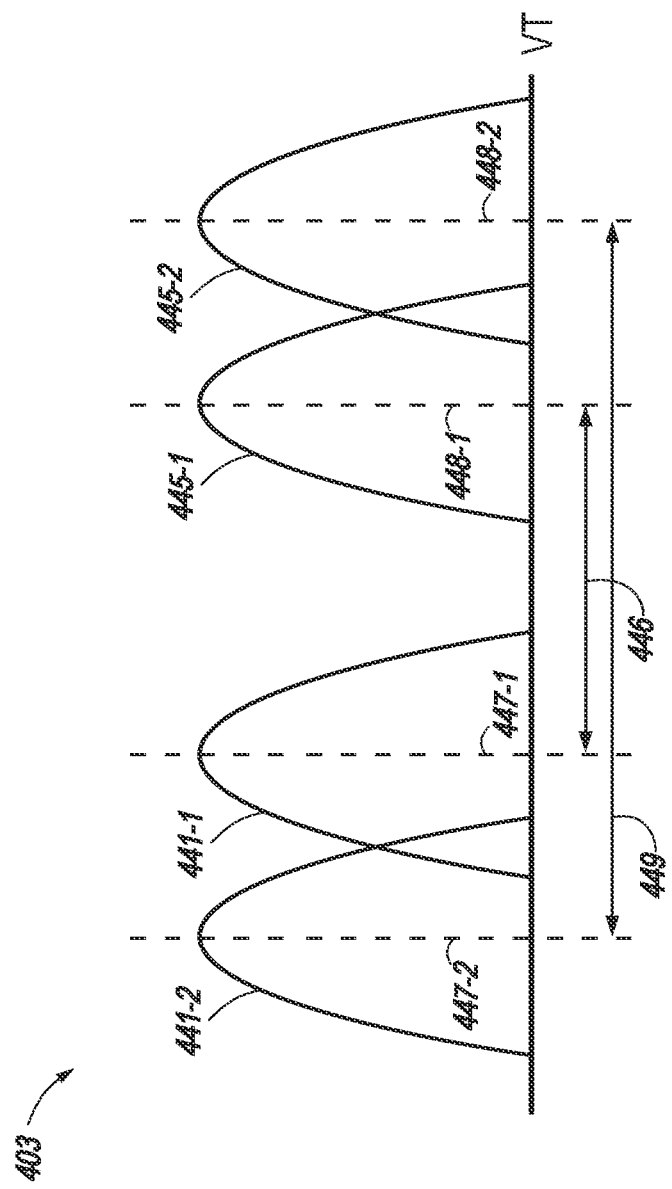
FIG. 4 illustrates an example diagram of performing a voltage window adjustment in accordance with some embodiments of the present disclosure.

FIG. 4 illustrates an example diagram 403 of performing a voltage window adjustment in accordance with some embodiments of the present disclosure. The example diagram 403 illustrates a number of voltage distributions 441-1, 441-2, 445-1, 445-2. A first set of voltage distributions 441-1, 445-1 correspond to a first voltage window 446 that is a distance from a highest distribution 447-1 of the first voltage distribution 441-1 to a highest distribution point 448-1 of the second voltage distribution 445-1. Over time, as the operation of the memory cells degrades and voltages storage drifts, the gap between the first 441-1 and second 445-1 voltage distributions may shrink, causing an increase in bit errors. In order to avoid this increase in bit errors, the first voltage window 446 can be adjusted to a second voltage window 449 that is greater than the first voltage window 446.

The second voltage window 449 can be associated with a second set of voltage distributions 441-2, 445-2. The second set of voltage distributions can include a third voltage distribution 441-2 and a fourth voltage distribution 445-2.

The second voltage windows 449 is a distance from a highest distribution 447-2 of the third voltage distribution 441-2 to a highest distribution point 448-2 of the fourth voltage distribution 445-2.

The detection of the increase of an error rate associated with a set of memory cells can cause the adjustment of the voltage window. For example, as the first voltage window 446 no longer provides an error rate less than a threshold error rate, the second voltage window 449 can be used and provides for an error rate less than a threshold error rate. The voltage window adjustment can specifically correspond to a decrease in the error rate until the error rate is below a threshold error rate. A check operation can be performed on the second voltage window in order to determine whether the second voltage window results in an error rate below the threshold error rate. In response to the check operation indicating that the second voltage window 449 lowers the error rate below the threshold error rate, the second voltage window 449 can be used for reading and writing operations on the set of memory cells. In response to the check operation indicating that the second voltage window 449 (or subsequent voltage windows that the initial voltage window is adjusted toward), the set of memory cells can be retired and no longer used for memory operations.

Figure 5:
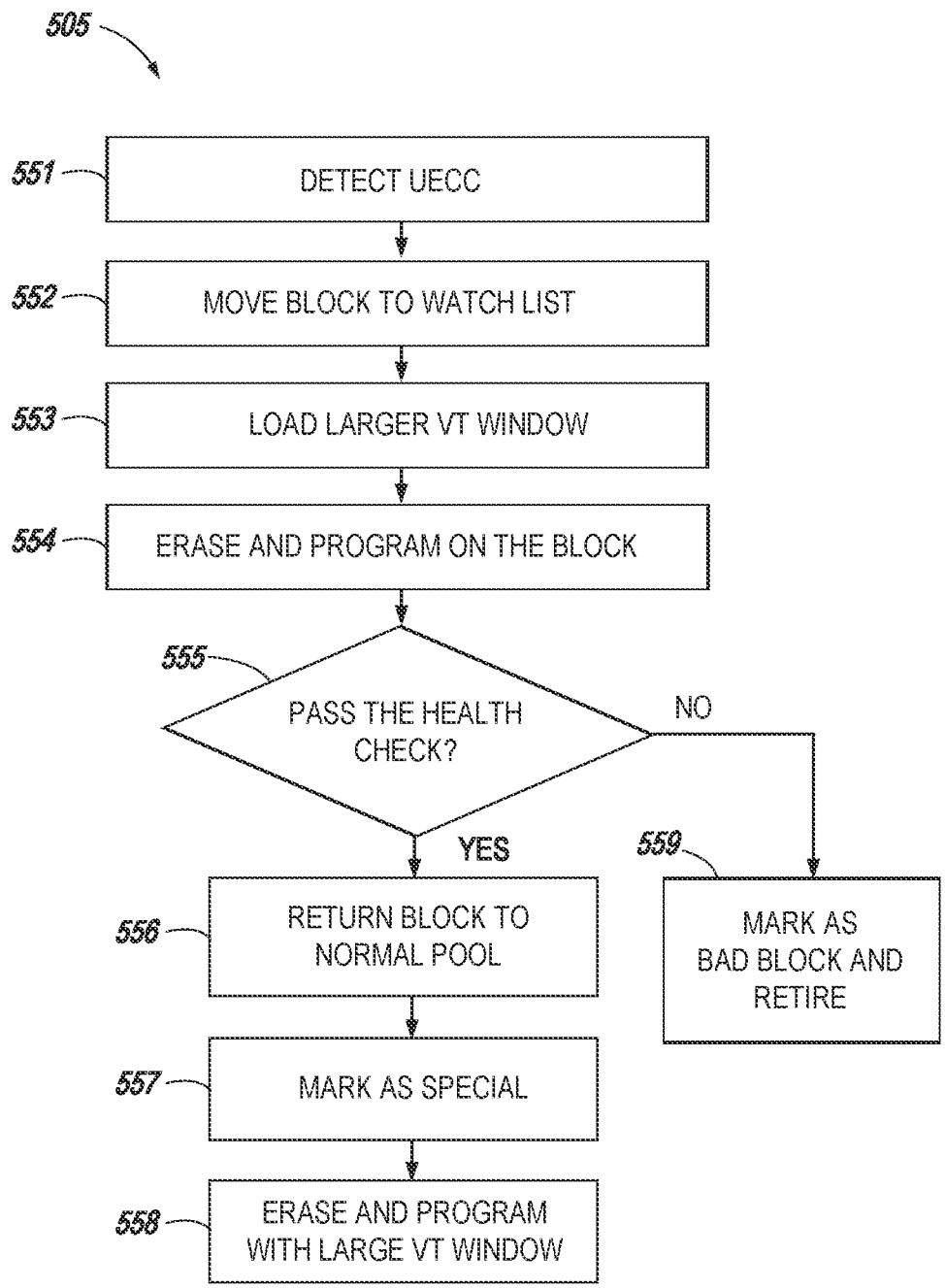
FIG. 5 is a flow diagram of an example method corresponding to adjusting a voltage window in accordance with some embodiments of the present disclosure.

FIG. 5 is a flow diagram of an example method 505 corresponding to adjusting a voltage window in accordance with some embodiments of the present disclosure. The method 505 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 505 is performed by the window adjustment component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 551, the processing device (e.g., processing device 112) detects an uncorrectable error correction code (UECC) error. An UECC error can indicate that the data stored within a particular block has become corrupted (e.g., one or more bits have become incorrect due to various disturb mechanisms). A UECC error can also indicate that a particular block/page is defective (e.g., the particular block/page includes defective memory cells). As such, future read operations on the same block/page may also result in UECC errors, which can result in reduced system performance and/or system failure. In previous approaches of various memory systems, a block/page may be retired from use if an uncorrectable ECC error is encountered in association with a read operation performed on the block/page. However, retiring blocks/pages from use has drawbacks such as reducing the memory capacity of the system and increasing wear on the remaining blocks/pages, which can reduce the effective life of a memory device, among other drawbacks and thereby adjustment of the voltage window can be preferred, as is described herein At block 552, the processing device can move a block of memory to a watch list. The watch list can indicate which blocks of memory include error rates that are below a threshold error rate or are experiencing a threshold quantity of UECCs. In response, at block 553, the processing device can load a larger voltage window (e.g., a larger voltage NAND trimset) to be used for the corresponding set of memory cells experiencing the errors. At block 554, the processing device can erase and program on the block using the larger voltage window. The operation of erasing and programming using the larger voltage window can be checked by a check operation.

At block 555, a determination of whether the block of memory has passed the check operation (e.g., "pass the health check") can be performed. In response to the block of memory passing the check, at 556, the processing device can return the block to the normal pool. Further, at block 557, the processing device can mark the block of memory as special (e.g., indicate that the block of memory should use an adjusted voltage window such as the larger voltage window). At block 558, the processing device can erase and program the block of memory using the larger voltage window. In response to the block of memory not passing the check (e.g., failing the check), the processing device can mark the block of memory as a bad block and retire the bad block of memory.

Figure 6:
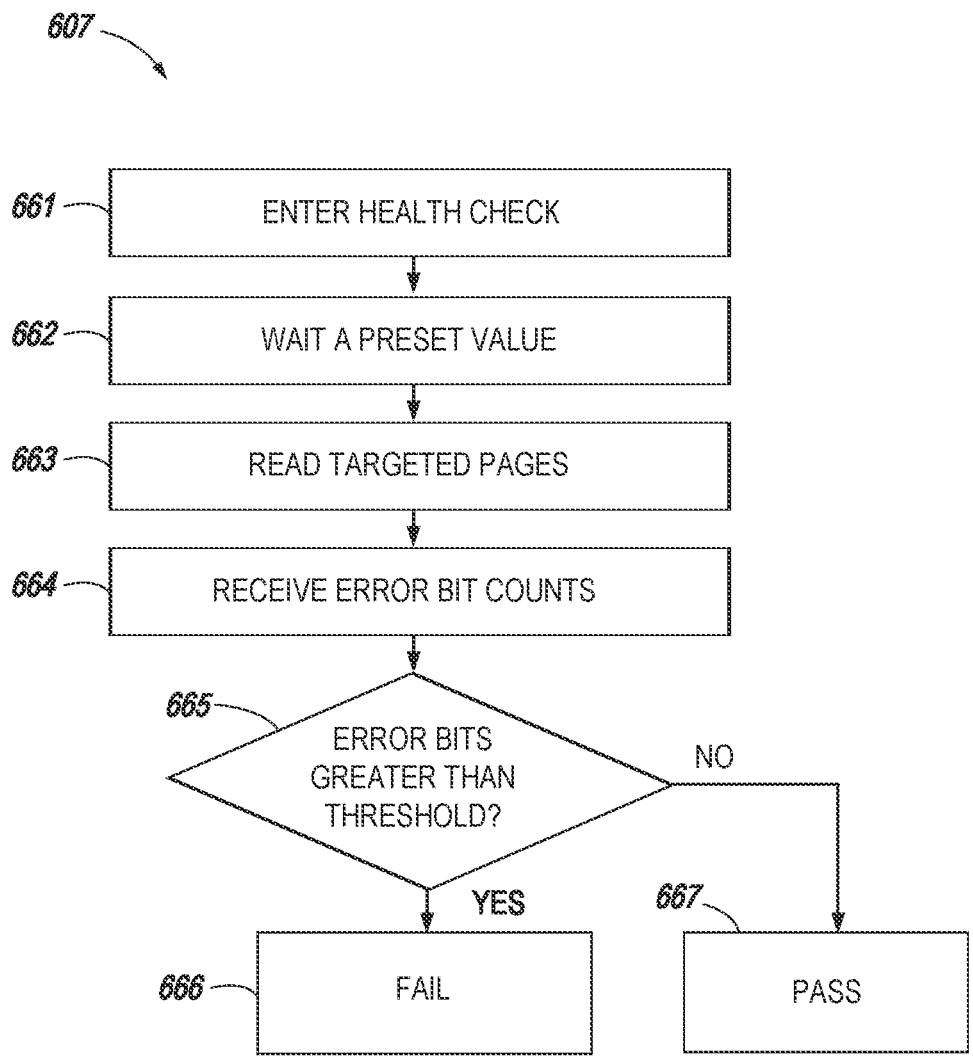
FIG. 6 is a flow diagram of an example method corresponding to performing a voltage window check in accordance with some embodiments of the present disclosure.

FIG. 6 is a flow diagram of an example method 607 corresponding to performing a voltage window check in accordance with some embodiments of the present disclosure. The method 607 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 607 is performed by the window adjustment component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 661, the processing device (e.g., processing device 112) can enter a block of memory into a health check. The block can be entered into the health check upon detection of an uncorrectable error correction code (UECC) error, as is described in association with FIG. 5 above. The health check can be entered upon detection of the UECC error or exceeding the error rate threshold or else a block of memory can be entered into a list to be performed at a particular time period during operation of the memory system.

At block 662, the processing device can write a preset value (e.g., a particular period of time) in order to recalibrate the block of memory cells or to allow the block of memory cells to reach an equilibrium prior to testing the block of memory cells. At block 663, the processing device can read the targeted pages in the block of memory. The read operation performed on the targeted pages in the block of memory can be performed using the second voltage window (or an adjusted voltage window, as described above) in order to determine whether the second voltage window is resulting in a lowered error rate for the targeted pages of memory cells. At block 664, the processing device can receive error bit counts associated with the targeted pages of memory cells.

In response to the error bits being greater than a threshold quantity of error bits ("YES"), at block 666, the processing device can indicate that the block of memory associated with the targeted pages of memory cells has failed the health check. In response to failure of the health check, the targeted pages of memory cells (and ultimately the block of memory cells, in some examples) can be retired and prevented from being used for future memory operations. In response to the error bits being less than the threshold error bits ("NO"), at block 667, the processing device can indicate that the targeted pages have passed the health check and can be used for further memory operations by using the second voltage window.

Figure 7:
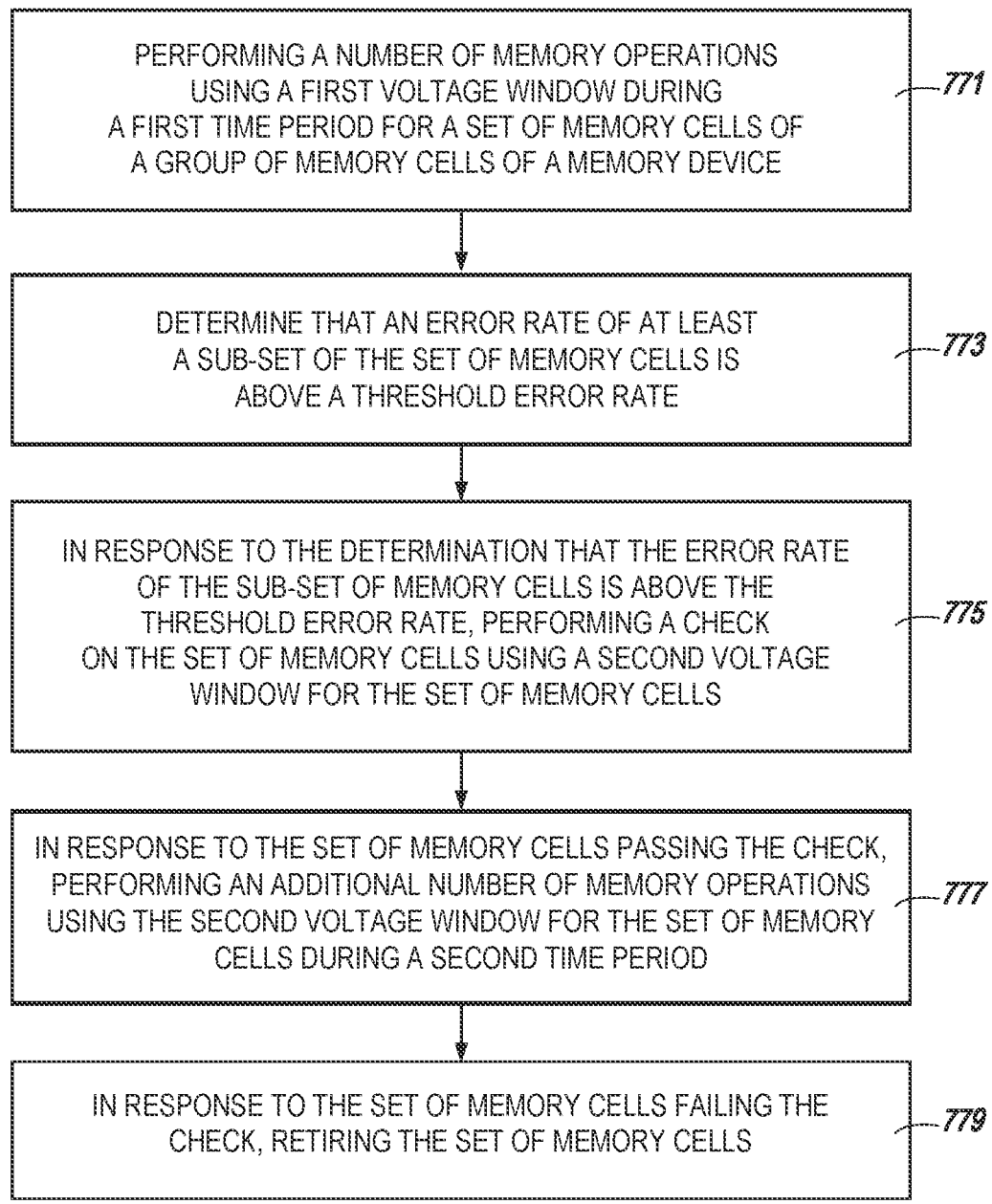
FIG. 7 is a flow diagram of an example method corresponding to performing a voltage window adjustment in accordance with some embodiments of the present disclosure.

FIG. 7 is a flow diagram of an example method 770 corresponding to performing a voltage window adjustment in accordance with some embodiments of the present disclosure. The method 770 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 770 is performed by the window adjustment component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 771, the processing device (e.g., processing device 112) can perform a number of memory operations using a first voltage window during a first time period for a set of memory cells of a group of memory cells of a memory device. In some examples, the first voltage window can be used for the set of memory cells of the group of memory cells during a first time period.

At block 773, the processing device can determine that an error rate of at least a sub-set of the set of memory cells is above a threshold error rate. In some examples, the processing device can determine that the error rate of the first set of memory cells is above the threshold error rate while using the first voltage window for the first set of memory cells. In some examples, the sub-set of memory cells is a page of memory cells. In some examples, the set of memory cells is a block of memory cells. In some examples, the determination of the error rate is performed at a particular period of time in a life cycle of the system. In some examples, the determination of the error rate is performed at particular time intervals during a life cycle of the system. In some examples, the determination of the error rate is performed responsive to the set of memory cells experiencing a threshold level of wear cycling.

At block 775, the processing device can, in response to the determination that the error rate of the sub-set of memory cells is above the threshold error rate, perform a check on the set of memory cells using a second voltage window for the set of memory cells. In some examples, performing the check can include performing a threshold quantity of read operations on the set of memory cells. In some examples, performing the check can include determining a bit error count for the set of memory cells associated with performing the threshold quantity of read operations.

In some examples, the second voltage window is a particular amount greater than the first voltage window. In some examples, the particular amount is equal to an amount of voltage window that causes the set of memory cells to reduce a corresponding error rate by a particular threshold amount. In some examples, the second voltage window for the set of memory cells of the group of memory cells can be used during a second time period. In some examples, the check can be performed prior to using the second voltage window for normal memory operations. In some examples, the check is performed by performing a threshold quantity of read operations in the set of memory cells. In some examples, the processing device performs the check in response to the error rate of the at least a sub-set of the set of memory cells being above the threshold error rate.

At block 777, the processing device can, in response to the set of memory cells passing the check, perform an additional number of memory operations using the second voltage window for the set of memory cells during a second time period. In some examples, in response to the set of memory cells failing the check, the set of memory cells can be retired. In some examples, the method 770 can include, in response to the set of memory cells passing the check, marking the set of memory cells as a particular set of memory cells to operate using the second voltage window. In some examples, the set of memory cells are marked as the particular set of memory cells until an additional error threshold is exceeded.

Figure 8:
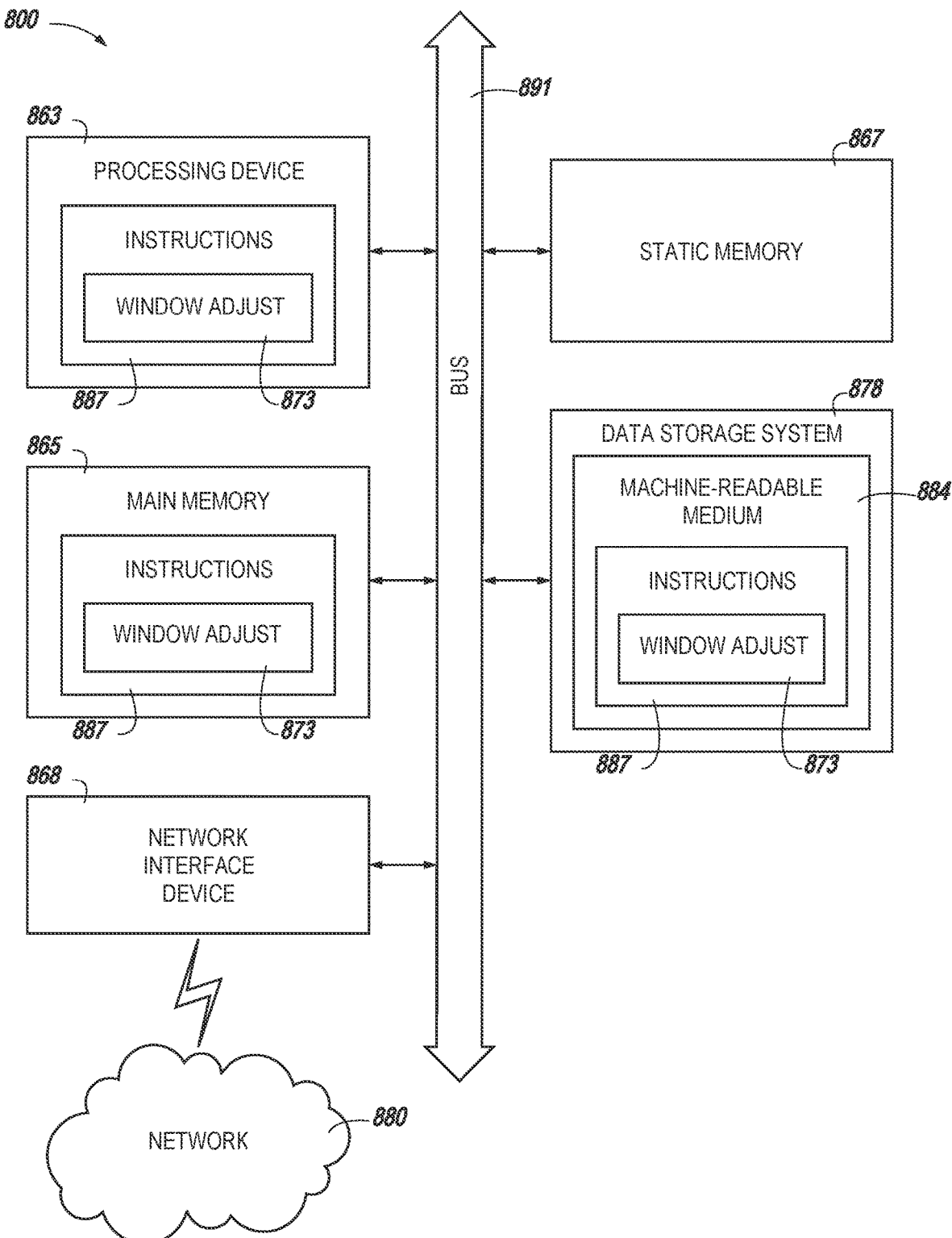
FIG. 8 is a block diagram of an example computer system in which embodiments of the present disclosure can operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 102 of FIG. 1) that includes, is coupled to, or utilizes a memory sub-system (e.g., the memory sub-system 104 of FIG. 1) or can be used to perform the operations of a controller (e.g., to adjust a parameter associated with programming a memory cell, such as a window adjustment component 113). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 863, a main memory 865 (e.g., read-only memory (ROM), flash memory, dynamic random access memory (DRAM) such as synchronous DRAM (SDRAM) or Rambus DRAM (RDRAM), etc.), a static memory 867 (e.g., flash memory, static random access memory (SRAM), etc.), and a data storage system 878, which communicate with each other via a bus 891.

Processing device 863 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 863 can also be one or more special-purpose processing devices such as an application specific integrated circuit (ASIC), a field programmable gate array (FPGA), a digital signal processor (DSP), network processor, or the like. The processing device 863 is configured to execute instructions 887 for performing the adjustment operations using a window adjustment component 873 (including adjusting a voltage window previously described) and steps discussed herein. The computer system 800 can further include a network interface device 868 to communicate over the network 880.

The data storage system 878 can include a machine-readable storage medium 884 (also known as a computer-readable medium) on which is stored one or more sets of instructions 887 or software embodying any one or more of the methodologies or functions described herein. The instructions 887 can also reside, completely or at least partially, within the main memory 865 and/or within the processing device 863 during execution thereof by the computer system 800, the main memory 865 and the processing device 863 also constituting machine-readable storage media. The machine-readable storage medium 884, data storage system 878, and/or main memory 865 can correspond to the memory sub-system 104 of FIG. 1.

In one embodiment, the instructions 887 include instructions to implement functionality corresponding to adjustment of a voltage window (e.g., window adjustment component 113 of FIG. 1). While the machine-readable storage medium 884 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
 a memory component including a group of memory cells; and
 a processing device coupled to the memory component and configured to:
  during a first time period, program a set of memory cells of the group of memory cells using a first voltage window corresponding to a pair of adjacent threshold voltage (Vt) distributions;
  determine that an error rate of a sub-set of the set of memory cells is above a threshold error rate;
  in response to the determination that the error rate of the sub-set of memory cells is above the threshold error rate:

erase the sub-set of memory cells and program the sub-set of memory cells using a second voltage window corresponding to the pair of adjacent Vt distributions; and perform a check on the sub-set of memory cells, the check comprising performing a quantity of read operations on the sub-set of memory cells; and in response to the sub-set of memory cells passing the check, use the second voltage window for programming the set of memory cells of the group of memory cells during a second time period.

2. The apparatus of claim 1, wherein the processing device is configured to determine that the error rate of the sub-set of memory cells is above the threshold error rate while using the first voltage window for the sub-set of memory cells.

3. The apparatus of claim 1, wherein the first voltage window is shorter than the second voltage window.

4. The apparatus of claim 1, wherein the sub-set of memory cells is a page of memory cells.

5. The apparatus of claim 1, wherein the set of memory cells is a block of memory cells.

6. The apparatus of claim 1, wherein the processing device performs the check by performing a threshold quantity of read operations on the sub-set of memory cells and determining an error rate for the sub-set of memory cells associated with performing the threshold quantity of read operations.

7. A method, comprising:

performing a number of memory operations including programming a set of memory cells of a group of memory cells of a memory device using a first voltage window corresponding to a pair of adjacent threshold voltage (Vt) distributions during a first time period for the set of memory cells;

determine that an error rate of at least a sub-set of the set of memory cells is above a threshold error rate;

in response to the determination that the error rate of the sub-set of memory cells is above the threshold error rate;

erasing the subset of memory cells and programming the sub-set of memory cells using a second voltage window corresponding to the pair of adjacent Vt distributions; and performing a check on the subset of memory cells; the check comprising performing a quantity of read operations on the sub-set of memory cells and determining an error rate for the quantity of read operations; and in response to the set of memory cells passing the check, performing an additional number of memory operations using the second voltage window for programming the set of memory cells during a second time period.

8. The method of claim 7, wherein, in response to the sub-set of memory cells failing the check, retiring the set of memory cells.

9. The method of claim 7, wherein performing the check on the sub-set of memory cells comprises:

performing a threshold quantity of read operations on the sub-set of memory cells; and determining a bit error count for the sub-set of memory cells associated with performing the threshold quantity of read operations.

10. The method of claim 7, wherein, in response to the sub-set of memory cells passing the check, marking the set of memory cells as a particular set of memory cells to operate using the second voltage window.

11. The method of claim 10, wherein the set of memory cells is marked as the particular set of memory cells until an additional error threshold is exceeded.

12. The method of claim 7, wherein the second voltage window is a particular amount greater than the first voltage window.

13. The method of claim 12, wherein the particular amount is equal to an amount of voltage window that causes the sub-set of memory cells to reduce a corresponding error rate by a particular threshold amount.

14. A system, comprising:

a memory component including a group of memory cells; and a processing device coupled to the memory component and configured to:

perform a number of memory operations using a first voltage window corresponding to a pair of threshold voltage (Vt) distributions to program a set of memory cells of a group of memory cells during a first time period for the set of memory cells;

erase a sub-set of memory cells of the set of memory cells and program the sub-set of memory cells using a second voltage window corresponding to the pair of Vt distributions;

perform a check on the sub-set of memory cells, the check comprising performing a quantity of read operations on the sub-set of memory cells and determining an error rate associated with the quantity of read operations;

in response to the sub-set of memory cells passing the check, perform an additional number of memory operations using the second voltage window to program the set of memory cells during a second time period; and in response to the sub-set of memory cells failing the check, retire the set of memory cells.

15. The system of claim 14, wherein the processing device is configured to, prior to erasing the sub-set of memory cells and programming the subset of memory cells using the second voltage window, determine that an error rate of at least one sub-set of the set of memory cells is above a threshold error rate.

16. The system of claim 15, wherein the processing device is further configured to perform the determination of the error rate of at least one sub-set of the memory cells at a particular period of time in a life cycle of the system.

17. The system of claim 15, wherein the processing device is further configured to perform the determination of the error rate of at least one sub-set of the memory cells at particular time intervals during a life cycle of the system.

18. The system of claim 15, wherein the processing device is further configured to perform the determination of the error rate of at least one sub-set of the memory cells responsive to the set of memory cells experiencing a threshold level of wear cycling.

19. The system of claim 14, wherein the processing device is configured to perform the check in response to an error rate of at least the sub-set of the set of memory cells being above a threshold error rate.

* * * * *